US012085581B2

(12) United States Patent
Ito et al.

(10) Patent No.: US 12,085,581 B2
(45) Date of Patent: Sep. 10, 2024

(54) AUTOMATIC ANALYZER (71) Applicant: HITACHI HIGH-TECH CORPORATION, Tokyo (JP)

(72) Inventors: Masayuki Ito, Tokyo (JP); Osamu Matsumoto, Tokyo (JP); Ryota Watanabe, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 830 days.

(21) Appl. No.: 17/274,797

(22) PCT Filed: Nov. 12, 2019

(86) PCT No.: PCT/JP2019/044268
§ 371 (c)(1),
(2) Date: Mar. 10, 2021

(87) PCT Pub. No.: WO2020/121711
PCT Pub. Date: Jun. 18, 2020

(65) Prior Publication Data
US 2022/0026453 A1 Jan. 27, 2022

(30) Foreign Application Priority Data
Dec. 11, 2018 (JP) ................................ 2018-231528

(51) Int. Cl.
*G01N 35/00* (2006.01)
*G01N 35/10* (2006.01)

(52) U.S. Cl.
CPC . *G01N 35/00871* (2013.01); *G01N 35/00732* (2013.01); *G01N 35/1002* (2013.01)

(58) Field of Classification Search
None
See application file for complete search history.

(56) References Cited

U.S. PATENT DOCUMENTS 5,299,141 A * 3/1994 Hungerford ......... G02B 6/4206
422/82.11
5,988,857 A * 11/1999 Ozawa ............... G01N 35/0095
510/161

(Continued)

FOREIGN PATENT DOCUMENTS

JP 2001-281258 A 10/2001
JP 2008-209328 A 9/2008

(Continued)

OTHER PUBLICATIONS

Extended European Search Report received in corresponding European Application No. 19897391.9 dated Aug. 5, 2022.

(Continued)

*Primary Examiner* — Brian R Gordon
(74) *Attorney, Agent, or Firm* — MATTINGLY & MALUR, PC (57) ABSTRACT

The automatic analyzer includes a first storage device that stores sample information including a measurement result of a reaction solution for each sample and a second storage device that stores the sample information on at least a part of the samples among the sample information stored in the first storage device, in which when the automatic analyzer reaches a predetermined operation state, the control device performs a backup process of backing up the sample information on the samples satisfying a predetermined backup condition from the first storage device to the second storage device, and deleting the sample information on the backed up samples from the first storage device.

4 Claims, 6 Drawing Sheets

(56) References Cited

U.S. PATENT DOCUMENTS

| | | | |
|---|---|---|---|
| 6,440,369 B1* | 8/2002 | Oonuma | G01N 35/00594 |
| | | | 422/63 |
| 11,169,166 B2* | 11/2021 | Tamezane | B01L 3/527 |
| 2001/0051952 A1 | 12/2001 | Nakazato | |
| 2009/0125271 A1* | 5/2009 | Mizumoto | G01N 35/00722 |
| | | | 702/108 |
| 2009/0202390 A1 | 8/2009 | Iizumi et al. | |
| 2011/0223682 A1* | 9/2011 | Wakamiya | G01N 35/00732 |
| | | | 422/68.1 |
| 2013/0344622 A1* | 12/2013 | Wakamiya | G01N 35/1011 |
| | | | 422/69 |
| 2015/0056663 A1* | 2/2015 | Tajima | B01F 31/445 |
| | | | 435/297.1 |
| 2016/0363593 A1* | 12/2016 | Sebastiao | G01N 33/57415 |
| 2017/0130262 A1* | 5/2017 | Dalton | C12Q 1/6879 |
| 2019/0041386 A1 | 2/2019 | Yabutani et al. | |

FOREIGN PATENT DOCUMENTS

| | | |
|---|---|---|
| JP | 2010-071647 A | 4/2010 |
| JP | 2013-174454 A | 9/2013 |
| JP | 2016-45004 A | 4/2016 |

OTHER PUBLICATIONS

International Search Report of PCT/JP2019/044268 dated Dec. 24, 2019.

Chinese Office Action received in corresponding Chinese Application No. 201980073953.1 dated Jun. 29, 2023.

\* cited by examiner

FIG. 3

| CHECK ITEMS | CONTENTS |
|---|---|
| 301 — HOST SENT | SAMPLE INFORMATION HAS ALREADY REPORTED TO EXTERNAL SYSTEM |
| 302 — COMPLETE | MEASUREMENT STATE OF SAMPLE FOR ALL ITEM RESULT HAS ALREADY BEEN OUTPUT (NO ABNORMALITY) |
| 303 — INCOMPLETE | MEASUREMENT STATE OF SAMPLE FOR ALL ITEM RESULT HAS ALREADY BEEN OUTPUT (ABNORMALITY) |

| | DEVICE STATE | CHANGE IN SAMPLE INFORMATION | ENABLE / DISABLE OF SAMPLE AUTOMATIC DELETION EXECUTION |
|---|---|---|---|
| 601 | STAND BY | NO CHANGE | ENABLE |
| 602 | PREPARATION | NO CHANGE | DISABLE |
| 603 | OPERATION | CHANGE | DISABLE |
| 604 | RACK COLLECT END | CHANGE | DISABLE |
| 605 | RACK RECEPTION | NO CHANGE | ENABLE |

FIG. 7

SAMPLE LIST — 700

| STATUS | SEQ. NO. | SAMPLE ID | RACK ID | TYPE | COMMENT | DATE/TIME | CHECK | RESULT |
|---|---|---|---|---|---|---|---|---|
| HOST SENT | 1 | 1234 | N500 01-1 | SER/PL | ABDE | 10/6 15:10:15 | | |
| COMPLETE | 2 | 2345 | N500 01-2 | SER/PL | ABDE | 10/6 15:10:30 | | |
| COMPLETE | 3 | 3456 | N500 01-3 | SER/PL | ABDE | 10/6 15:10:45 | | |
| INCOMPLETE | 4 | 4567 | N500 01-4 | SER/PL | ABDE | 10/6 15:10:50 | ✓ | |

| | CHECK ITEMS | CONTENTS |
|---|---|---|
| 1001 | MANUAL | SAMPLE CHECKED BY USER |
| 1002 | CHANGE IN THE DATE | SAMPLE WHOSE REGISTRATION DATE HAS BEEN UPDATED |
| 1003 | AFTER REGISTRATION | SAMPLE WHOSE REGISTRATION TIME (hr) HAS PASSED |

AUTOMATIC ANALYZER

TECHNICAL FIELD

The present invention relates to an automatic analyzer.

BACKGROUND TECHNOLOGY

An automatic analyzer is a device for qualitative analysis or quantitative analysis of a specific component contained in a biological sample such as blood, urine, cerebrospinal fluid, and is used, for example, in the field of clinical testing, to evaluate a health status of a patient. In particular, the automatic analyzer is rapidly spreading mainly in facilities that need to process many patient specimens in a short time, such as large hospitals and clinical laboratory centers, and various automatic analyzers such as large size, medium size, and small size have been developed. according to the required processing capacity.

In such an automatic analyzer, automation of maintenance and backup technology for quickly returning in the event of an abnormality are provided, and it is desirable to enhance functions to reduce the burden of management and operation work.

As a technique for backing up such information, for example, Patent Literature 1 discloses an automatic analyzer including selection means for selecting at least one of alarms, items, specimen numbers, and measurement dates, and storage means for storing measurement results corresponding to information selected by the selection means, in which the measurement results stored in the storage means are protected from being erased by normal measurement result erasure.

For example, Patent Literature 2 discloses an analyzer that analyzes components of a sample, which includes backup means for backing up in-device registration information of the analyzer based on predetermined conditions, first storage means for storing the in-device registration information, second storage means for storing the backup information, and selection means for selecting desired backup information from the second storage means, and recovery means for performing a recovery operation based on the backup information selected by the selection means.

Further, for example, Patent Literature 3 discloses an automatic analyzer equipped with storage means for storing information including the measurement result of a biological sample, which includes at least two of the storage means and control means for controlling the storage means so that information including the measurement result is stored at substantially the same time in the at least two storage means, and at least one of the at least two storage means is removable to an outside.

PRIOR ART LITERATURE

Patent Literature

Patent Literature 1: Japanese Patent Unexamined Application Publication No. 2010-071647
Patent Literature 2: Japanese Patent Unexamined Application Publication No. 2001-281258
Patent Literature 3: Japanese Patent Unexamined Application Publication No. 2008-209328

SUMMARY OF THE INVENTION

Technical Problem

By the way, in recent years, the processing capacity of the automatic analyzers has improved, and a large number of specimens have been inspected quickly. On the other hand, the amount of information that can be stored in the automatic analyzer is limited, and there is a need to periodically delete specimen information such as test results stored in the device. For example, the deletion of such information may be performed so that the specimen information of all specimens is deleted at the start or end of a day at once. However, since there is no concept of a starting time or a work time in an automatic analyzer intended for 24-hour operation, when the maximum number of specimens that can be registered is reached, the user must check the status of each specimen information each time, and delete the specimen information that needs to be stored while storing the specimen information on a storage medium such as a CD or DVD and printing the specimen information on paper. If the user accidentally deletes the specimen information that has not been saved, since the deleted specimen information cannot be confirmed, there is a need to collect the specimen again and perform the analysis, and it takes time and effort.

In the conventional art disclosed in Patent Literature 1, for example, conditions such as alarm, item, specimen number, measurement date, and so on are set in advance, and a backup operation of specimen information is performed according to the conditions set at a time when the measurement result is received.

However, in the conventional art disclosed in Patent Literature 1, the deletion per se of the specimen information must be performed manually while the user grasps the current specimen information, and it takes time and effort to delete the specimen information.

In the conventional art disclosed in Patent Literature 2, for example, a system backup operation is automatically performed using a condition that changes the state of the automatic analyzer as a trigger, such as when operating before automatic power off, measurement start, STAT start, pose release, and so on, and backup can be started manually.

Further, in the conventional art disclosed in Patent Literature 3, at least two storage media for maintaining information on the system are always prepared, and a writing operation is performed at the same time, so that replication work at the time of failure is unnecessary, and external failures can be analyzed in the outside without stopping the system. In addition, when a sufficient speed is not obtained for the processing of the system, a backup work is performed at a pre-set timing in view of the operation status of the entire system.

However, in the conventional art disclosed in Patent Literature 2 and Patent Literature 3, not only a significant cost is required to require two or more storage media to perform a backup of the entire system, but also a great deal of time is required from backing up the entire system. In addition, it is assumed that it is difficult to back up the system in reality at the timing of system switching.

The present invention has been made in view of the above circumstances, and an object of the present invention is to provide an automatic analyzer that can reduce the time and effort required to confirm and delete the contents of specimen information to be deleted, and to reduce the cost and time required for backing up the specimen information.

Solution

In order to achieve the above object, the present invention is directed to an automatic analyzer including a sample container transportation mechanism that places and transports a sample container containing a sample to be analyzed, a reagent container holding mechanism that places and holds a reagent container containing a reagent for reacting with the reagent container, a reaction mechanism that places a reaction container for reacting the sample with the reagent, a sample dispensing mechanism that dispenses the sample in the sample container as a specimen in the reaction container, a reagent dispensing mechanism that dispenses the reagent of the reagent container into the reaction container, and a measuring device that measures a reaction solution in which the sample dispensed as the sample in the reaction container and the reagent are mixed together, the automatic analyzer including: a control device that controls the operation of the automatic analyzer; a first storage device that stores specimen information including the measurement result of the reaction solution for each specimen; and a second storage device that stores the specimen information on at least some of the specimens among the specimen information stored in the first storage device, in which when the automatic analyzer reaches a predetermined operation state, the control device performs a backup process of backing up the specimen information on the specimens satisfying a predetermined backup condition from the first storage device to the second storage device, and deleting the specimen information on the backed-up specimens from the first storage device.

Effects of the Invention

According to the present invention, the time required for confirming and deleting the contents of the specimen information to be deleted can be reduced, and the cost and time required for backing up the specimen information can be reduced. Further, the information to be deleted and backed up narrowed down to the specimen information, so that the time when the automatic analyzer cannot accept the user's request can be minimized by deleting the information for securing the storage capacity and the implementation of the backup, and an increase in the operation stop time of the automatic analyzer can be suppressed.

DETAILED DESCRIPTION

First Embodiment

One embodiment of the present invention will be described with reference to FIGS. 1 to 8.

Figure 1:
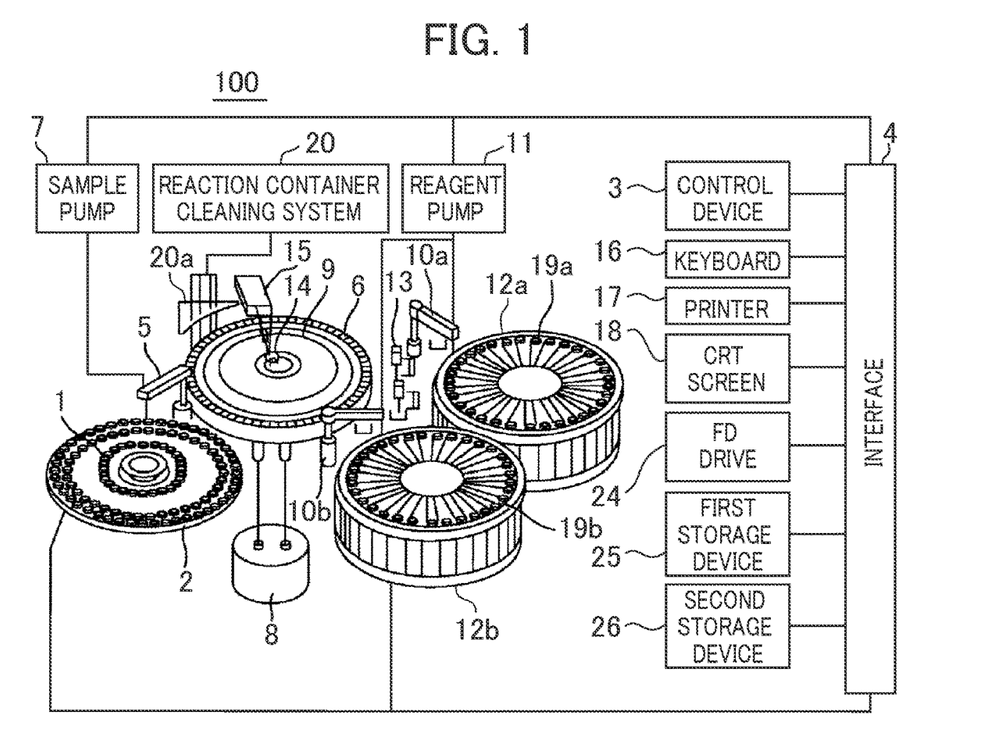
FIG. 1 is a diagram schematically showing an overall configuration of an automatic analyzer.

FIG. 1 is a diagram schematically showing the overall configuration of an automatic analyzer according to the present embodiment.

In FIG. 1, an automatic analyzer 100 roughly includes a sample disk 2, reagent disks 12a and 12b, a reaction disk 9, a sample dispensing probe 5, reagent dispensing probes 10a and 10b, a measuring device (light source 14, multi-wavelength photometer 15), a control device 3, a CRT screen 18, a first storage device 25, a second storage device 26, and the like.

The sample disk 2 is a sample container transportation mechanism in which sample containers 1 containing samples to be analyzed are placed and transported, and multiple sample containers 1 are arranged side by side in a surrounding direction. The sample disk 2 rotates so that the sample containers 1 are transported to predetermined positions.

The reagent disks 12a and 12b are reagent container holding mechanisms that hold reagent containers 19a and 19b containing reagents for reacting with the samples, respectively, and the multiple reagent containers 19a and 19b are arranged side by side in a surrounding direction. The reagent disks 12a and 12b rotate so that the reagent containers 19a and 19b are transported to predetermined positions. Further, the reagent disks 12a and 12b also have a role as storage for the reagent containers 19a and 19b, and have a function of keeping reagent containers 19a and 19b cool.

The reaction disk 9 is a reaction mechanism in which reaction containers 6 that react the samples and the reagent is placed, and the reaction containers 6 are arranged side by side in the surrounding direction. A sample dispensing probe 5 as a sample dispensing mechanism in which the samples in the sample containers 1 are dispensed into the reaction containers 6 as the specimens, and the reaction dispensing probes 10a and 10b as a reagent dispensing mechanism that dispenses the reagents of reagent containers 19a and 19b into the reaction containers 6 are disposed around the reaction disk 9. A sample pump 7 is connected to the sample dispensing probe 5, and the sample suction and discharge by the sample dispensing probe 5 are performed by the sample pump 7. Further, a reagent pump 11 is connected to the reagent dispensing probes 10a and 10b, and reagent suction and discharge by the reagent dispensing probes 10a and 10b are performed by the reagent pump 11.

A reaction solution mixed with the sample and the reagent which are dispensed as the specimen in the reaction container 6 is stirred by a stirring device 13. A constant temperature device 8 is connected to the reaction disk 9. A thermally conductive medium (for example, constant hot water) whose temperature is controlled at 37 degrees, for example, by the constant temperature device 8 is circulated in the reaction disk 9, and the reaction container 6 is immersed in constant hot water to maintain the temperature of the reaction solution.

The light source 14 and the multi-wavelength photometer 15, which configure the measuring device for measuring the reaction solution of the reaction container 6 are disposed in the reaction disk 9. In the measuring device, the transmitted light obtained from the light source 14 through the reaction solution of the reaction containers 6 is measured by a multi-wavelength photometer 15, and the measurement result is transmitted to the control device 3 through an A/D converter not shown. Further, the reaction disk 9 is provided with a reaction container cleaning mechanism 20a, and the reaction container 6 in which the measurement has been completed is cleaned by the cleaning solution from the reaction container cleaning system 20.

The control device 3 (processor) controls the entire operation of the automatic analyzer 100 and is connected to each configuration of the automatic analyzer 100 including the first storage device 25 and the second storage device 26 through an interface 4. The operation of the control device 3 is performed, for example, by entering by a keyboard 16 connected through the interface 4. In FIG. 1, for simplicity of illustration, a connection relationship between the control device 3 and each configuration of the automatic analyzer 100 is partially omitted. The control device 3 calculates an absorbance of the reaction solution from the measurement result of the multi-wavelength photometer 15 and the emission intensity of the light source 14. Further, the control device 3 converts the calculated absorbance to a concentration of a measurement target component in the specimen to be targeted, prints and outputs from a printer 17 connected through the interface 4, displays the concentration on a CRT screen 18, and stores the concentration in the first storage device 25.

In the first storage device 25, various programs and settings used for operation control of the automatic analyzer 100 are stored, and the specimen information entered and registered in the control device 3 by the keyboard 16 or the like are stored. An upper limit of the storage capacity of the specimen information in the first storage device 25 is set. The specimen information includes information such as ID for identifying a specimen that is a specimen dispensing, ID for identifying the specimen itself, items to be analyzed, and measurement results in each item, and information such as the measurement results and settings are added and changed. Information such as the measurement results stored in the first storage device 25 can be transmitted to the FD drive 24 or the second storage device 26 through the interface 4 and stored.

In the automatic analyzer 100 according to the embodiment described above, the specimen information is registered to perform the analysis of the sample, and the test item to be analyzed is registered. The upper limit of the number of specimen information that can be registered is set, and in order to register the specimen information in a state where the upper limit is reached, there is a need to delete unnecessary specimen information in advance. In the automatic analyzer 100 according to the present embodiment, the specimen information stored in the first storage device 25 is automatically deleted according to the conditions set in advance by a setting screen to be described later, and a backup process (storage of the specimen information into the second storage device 26 and automatic deletion of the specimen information in the first storage device 25) is performed to automatically back up the specimen information at a preset time. As a result, the user can operate the automatic analyzer 100 without being aware of the number of registrations of specimen information.

For example, there are three methods for selecting the measurement state that should be subject to automatic deletion of the specimen to be described below, and any of those methods is selected to perform a backup process (backup and deletion) of the relevant specimen information at a time set by the user.

(Method 1) A method of setting the condition that the specimen information has been reported to an external system.

(Method 2) A method of setting the condition that the measurement state of the specimen is in a state in which all item results have been output (without abnormality).

(Method 3) A method of setting the condition that the measurement state of the specimen is in a state where all item results have been output (with abnormality).

In the measurement state (with abnormality) in the methods 2 and 3, the result value measured and output does not fit within a predetermined range (normal value), and the measurement state in which an abnormality is observed, and in the measurement state (without abnormality), the result value falls within a predetermined range (normal value), and no abnormality is observed.

In (Method 1), the condition that the specimen information has been reported to the external system has been set, and the specimen information has already been reported to the external system, and since the specimen information is unnecessary specimen information on the system, the user can greatly save the trouble of manually deleting the specimen information by the above set condition. In (Method 2), the condition that the measurement state of the specimen is in the state where all item results have been output (without abnormality) is set, and in (Method 3), the condition that the measurement state of the specimen is in the state where all item results have been output (with abnormality) is set, but in each of (Method 2) and (Method 3), the results already appear all together, and the user remains the backup work of the specimen information. In (Method 1), the present condition is set to automatically enable backup and automatic deletion even in an environment without an external system, and the user can greatly save the trouble of manually backing up and deleting.

Figure 2:
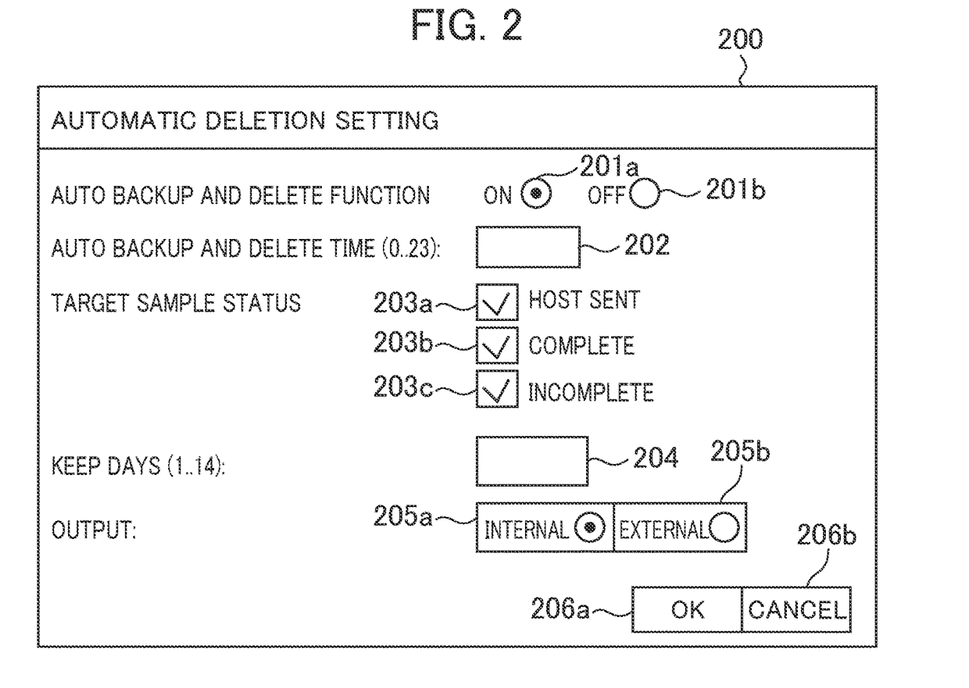
FIG. 2 is a diagram showing a setting screen related to an automatic deletion function (automatic backup process) of sample information according to a first embodiment.

FIG. 2 is a diagram showing a setting screen for an automatic deletion function (automatic backup process) of the specimen information.

In a setting screen 200 shown in FIG. 2, "Auto BackUp and Delete Function" is an item for setting the automatic deletion function to be enabled or disabled. In addition, "Auto Backup and Delete Time" is an item that set a time when the backup process is performed when the automatic deletion function is enabled. "Target Sample Status" is an item that, when the automatic deletion function is enabled, the information of the specimen to be deleted is set. "Keep days" is an item that, when the automatic deletion function is enabled, a storage period of the specimen to be deleted is set. "Output" is an item that, when the automatic deletion function is enabled, an output destination of the backup of the specimen information to be deleted is set to a PC internal (second storage device 26) or an external media (FD drive 24).

When the automatic deletion function of the specimen information is enabled, "Auto BackUp and Delete Function" is set to "ON" 201a, and when the automatic deletion function is disabled, "Auto BackUp and Delete Function" is set to "OFF" 201b. An execution time for performing the automatic deletion function of the specimen information is set, for example, a time from 0:00 to 23:00 in an input portion 202 of "Auto BackUp and Delete Time". Further, the measurement state of the specimen to be deleted is set by selecting a checkbox 203a of "Host Sent", the checkbox 203b of "Complete", and a checkbox 203c of "Incomplete".

Figure 3:
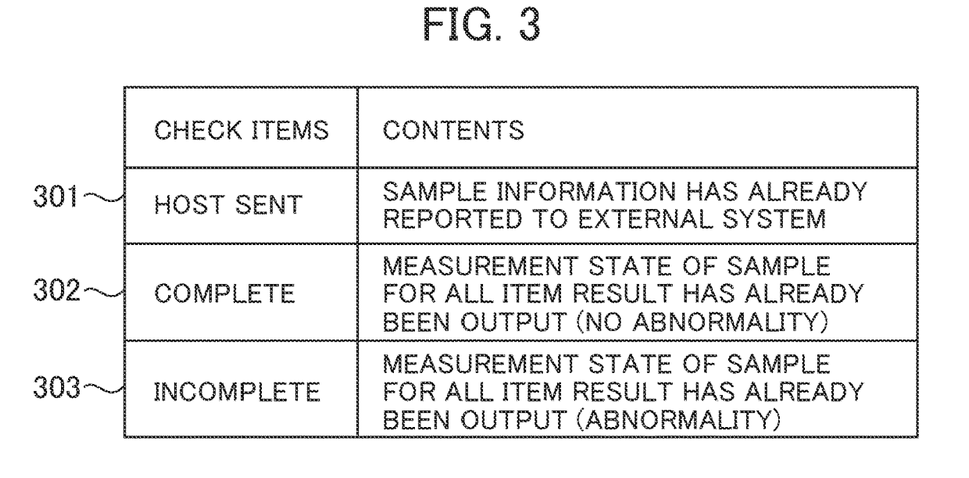
FIG. 3 is a diagram illustrating setting conditions shown in FIG. 2.

FIG. 3 is a diagram illustrating the setting conditions shown in FIG. 2.

As shown in FIG. 3, a measurement state "Host Sent" 301 is a state in which the specimen information has been reported to an external system connected to the analyzer. In addition, "Complete" 302 is a measurement state of the specimen in which the results of all items requested have been output, and there is no abnormality in the results. Further, "Incomplete" 303 is a measurement state of the specimen in which the results of all items requested have been output, and there is an abnormality in the results.

In the setting screen 200, the measurement state of the specimen to be deleted can be set by a combination of three settings: "Host Sent" 301, "Complete" 302, and "Incomplete" 303. All of those measurement states are in the state in which the results have been output, but if the measurement state in which the results have not been output is included in an automatic deletion target, the specimen to be measured may be lost, so that the measurement state is excluded from the automatic deletion target.

Further, in the setting screen 200, for example, the storage period of the specimen is set to from 1 to 14 days in the input portion 204, and when an output destination of backup data which is pre-operation for deleting the specimen is set to an internal device such as an HD, "Internal" 205a is set. When the output destination is set to an external storage medium such as an FD or a USB, "external I" 205 is set. Further, when an "OK" button 206a is selected, the automatic deletion function of the specimen by the input content of the setting screen 200 is enabled, and the input content is discarded by selecting a "Cancel" button 206b.

Figure 4:
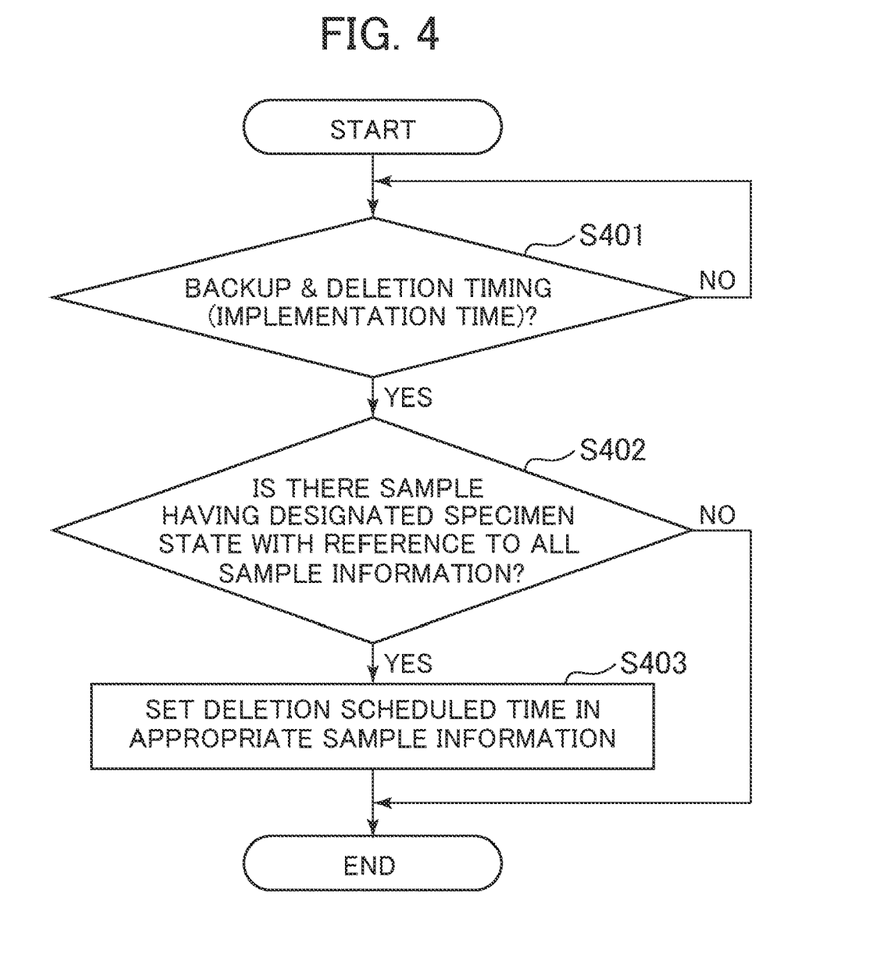
FIG. 4 is a flowchart showing a procedure of determining a deletion target of an automatic deletion function of a sample.

FIG. 4 is a flowchart showing a procedure for determining a deletion target of the automatic deletion function of the specimen.

In FIG. 4, it is first determined whether or not time setting information (setting of the input portion 202 in FIG. 2) for performing the automatic deletion function of the specimen matches a current time (Step S401), and when the determination result is NO, the process of Step S401 is repeated until the determination result is YES. Further, when the determination result in Step S401 is YES, all specimen information is subsequently referred to from the first storage device 25, it is determined whether or not there is specified specimen information (specimen information corresponding to the settings of checkboxes 203a, 203b, and 203c in FIG. 2) (Step S402), and when the determination result is YES, a scheduled deletion time is set to the corresponding specimen information (Step S403). Further, when the determination result in Step S402 is NO, the process is terminated.

Figure 5:
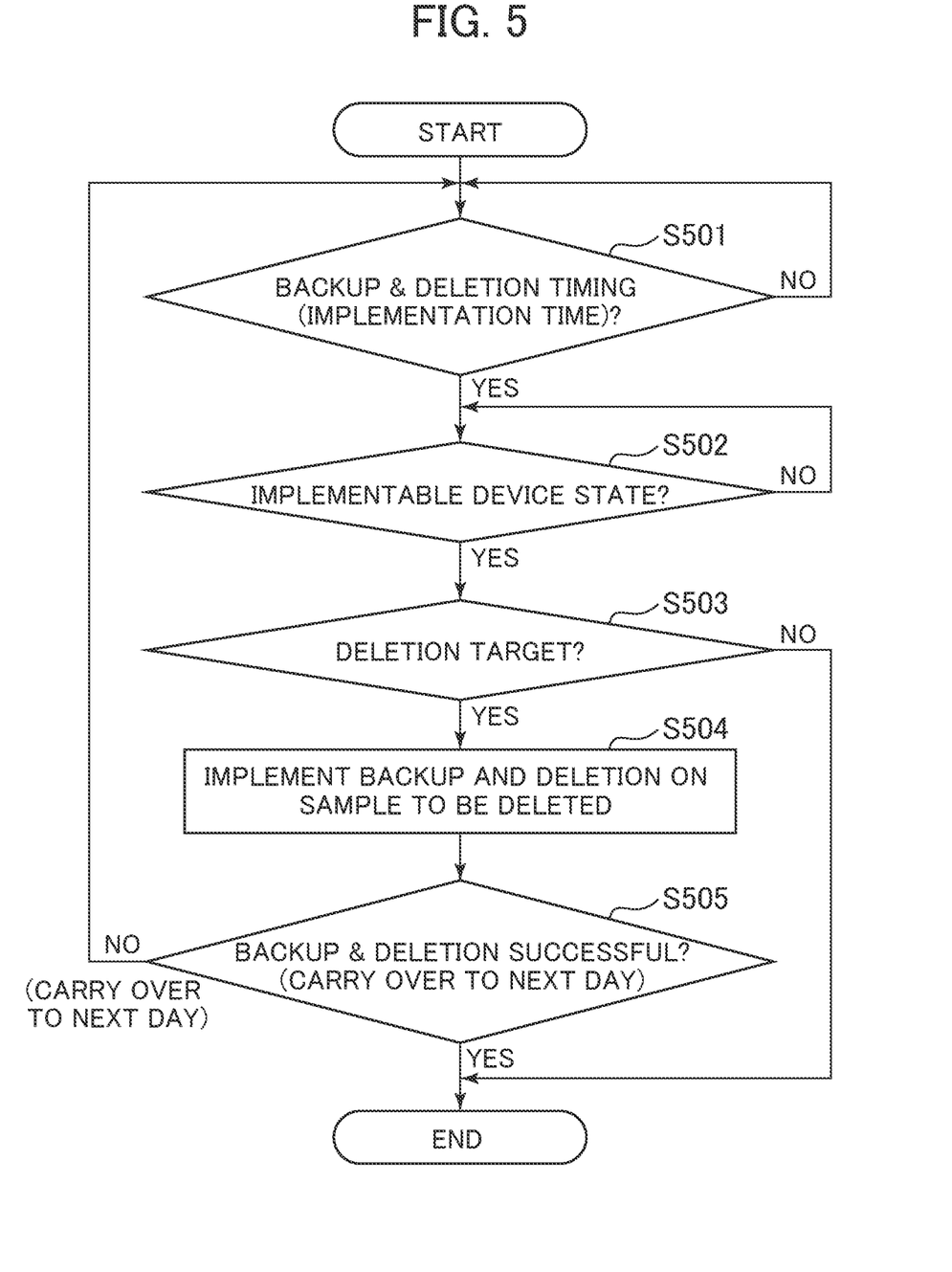
FIG. 5 is a flowchart showing a procedure for deleting the sample in the automatic deletion function of the sample.

FIG. 5 is a flowchart showing a procedure for conducting the specimen deletion of the automatic deletion function of the specimen.

In FIG. 5, it is first determined whether or not the time setting information (setting of the input portion 202 in FIG. 2) for implementing the automatic deletion function of the specimen matches the current time (Step S501), and when the determination result is NO, the process of Step S501 is repeated until the determination result is YES. Further, when the determination result in Step S501 is YES, the system checks whether or not the device state in which automatic deletion of the specimen can be performed (Step S502), and when the determination result is NO, the process of Step S502 is repeated until the determination result is YES.

Figure 6:
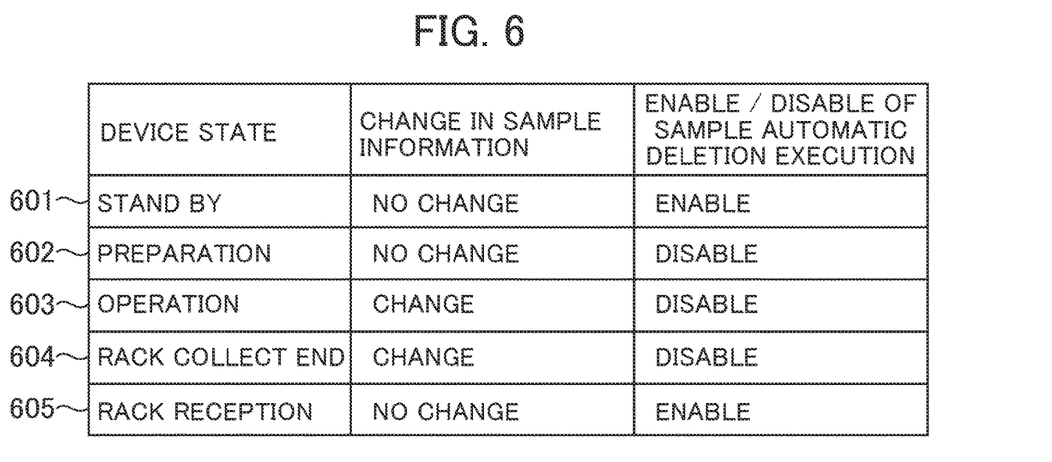
FIG. 6 is a diagram showing an example of a device state in which automatic deletion can be performed.

FIG. 6 is a diagram showing an example of a device state in which the automatic deletion can be performed.

In FIG. 6, when the device state is "Stand By" 601, the device state is a standby state that can accept all requests, and the specimen state does not change unless the user operates, and the automatic deletion of the specimen can be performed. When the device state is "Preparation" 602, the device state is a preparatory stage of the analysis operation, and there is no change in the specimen state. However, when the time has elapsed, the device state may transition to a state in which the specimen state changes so that the automatic deletion of the specimen cannot be performed. When the device state is "Operation" 603 or "Rack Collect End" 604, the analysis of the specimen is being performed, and the specimen state changes, so that the automatic deletion of the specimen cannot be performed. When the device state is "Rack Reception" 605, since the analysis of the specimen has been completed and the results of all specimens have been output so that the specimen state does not change, and the automatic deletion of the specimen can be performed.

The description will be returned to FIG. 5.

If the determination result in Step S502 is YES, that is, when the device state is "Stand By" 601 or "Rack Reception" 605, it is subsequently determined whether there is a specimen to be deleted (Step S503), and if the determination result is NO, the process is terminated. Further, when the determination result in Step S503 is YES, that is, when there is one specimen that has passed the time set in the input portion 403 of FIG. 4, the corresponding specimen is backed up and deleted (Step S504).

Figure 7:
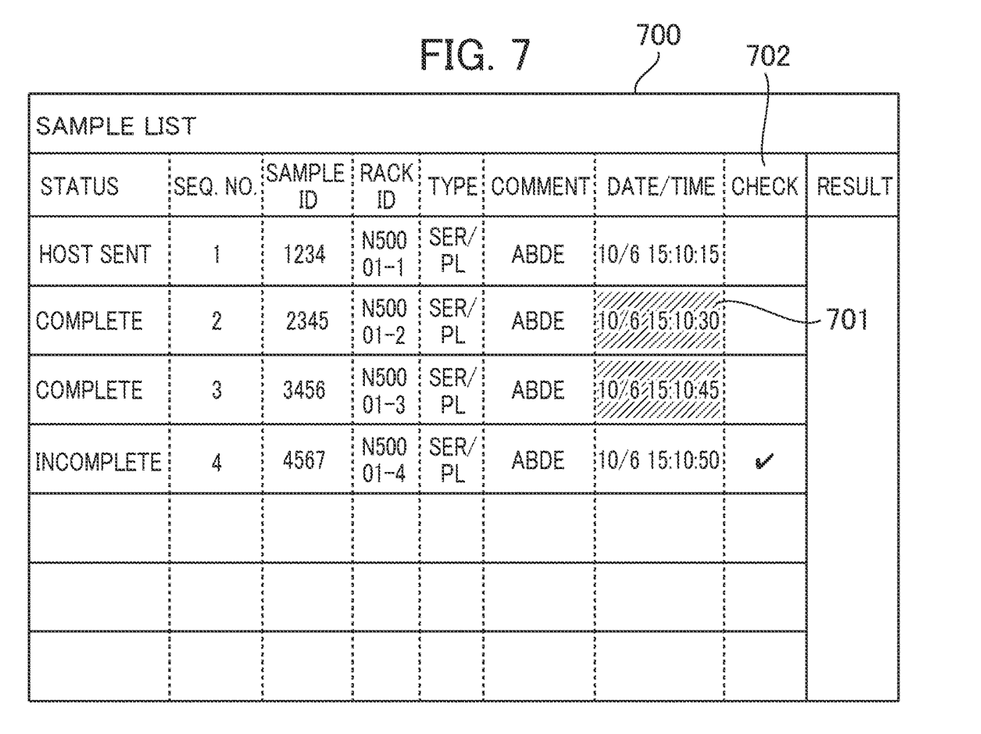
FIG. 7 is a diagram showing an example of a management screen for managing result information of the sample.

FIG. 7 is a diagram showing an example of a management screen for managing the result information of the specimen.

As shown in FIG. 7, on a management screen 700, it can be confirmed that there is the specimen information to be deleted by attaching a background color to time information 701 of the specimen information to be deleted. In the backup process, the backup is first performed according to the information set in the item of "Output" on the setting screen 200 of FIG. 2. That is, when the item of "Output" is set to "Internal" 205a, the specimen information stored in the first storage device 25 is backed up to the second storage device 26 on a different folder. Further, when the item of "Output" is set to "external", the specimen information stored in the second storage device 26 is backed up to external storage such as the FD drive 24. When the backup is successful, the specimen information stored in the first storage device 25 is deleted. When the backup process (automatic deletion and backup) is performed, the current device state is maintained until the backup process is completed. The reason for maintaining the device state is to refer to the specimen information in a database during automatic deletion and backup, and to prevent conflict processing from occurring and causing the system to hang by transitioning to other device states and referring to the same specimen information. In addition, if there is a request such as operation or stop from the user during the backup process, the request is held, and the request held is accepted when the automatic deletion and backup have been completed.

The description will be returned to FIG. 5.

When the process of Step S504 has been completed, it is subsequently determined whether or not the backup process, that is both the backup and deletion of the specimen information have been successful (Step S505), and the process is terminated when the determination result is YES. Further, when the determination result of Step S505 is NO, that is, when the backup process fails because an output destination of the backup data cannot be accessed or the capacity is not enough to back up, the backup process does not retry and returns to the process of Step S501 so as to carry over to an execution time of the next day. In addition, when the setting is changed in the state where there is a specimen to be deleted, the current deletion information is cleared, the measurement state is checked again at the time of executing the automatic deletion, the deletion target is determined for the specimen in the set measurement state (see 403 in FIG. 4), and a deletion timing is determined from the storage period (setting of the input portion 204 in FIG. 2).

The backed-up specimen information can be output from the reading screen.

Figure 8:
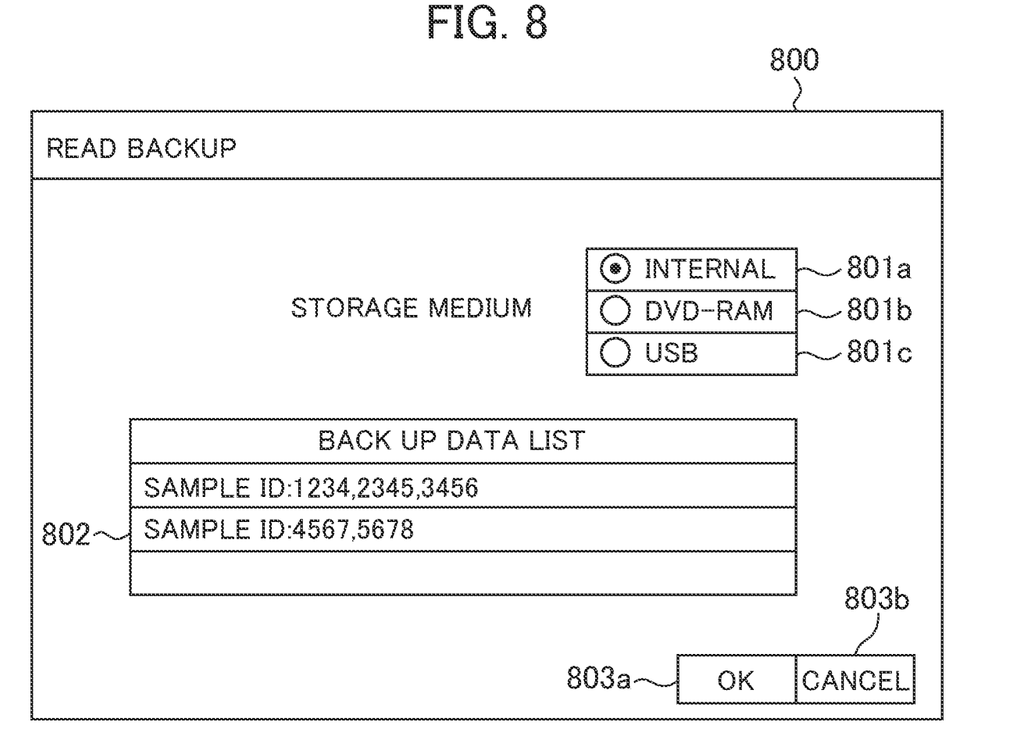
FIG. 8 is a diagram showing an example of a reading screen.

FIG. 8 is a diagram showing an example of a loading screen.

On a reading screen 800, if a backup destination of a read source is selected and specified from, for example, "Internal" 801*a*, "DVD-RAM" 801*b*, "USB" 801*c*, and so on, a list of specimen information backed up to the read source specified in a list 802 is displayed, and the specimen information is selected from the list, and "OK" button 803*a* is selected so that the specimen information can be output. Since the patient ID included in the specimen information is displayed in the list of specimen information, it is easy to select the specimen information that the user wants to confirm. Further, the "Cancel" button 803*b* is selected so that the reading of the specimen information can be canceled.

The effects of the present embodiment configured as described above will be described.

In the conventional art, there is a need for the user to manually perform the deletion per se of the specimen information while grasping the current specimen information, resulting in a problem that it takes time and effort to delete the specimen information. In addition, the conventional art suffers from not only a problem that a great deal of cost is required to require two or more storage media to perform the backup of the entire system, but also a problem that a great deal of time is required from backing up the entire system.

On the other hand, in the present embodiment, the first storage device 25 that stores the specimen information including the measurement result of the reaction solution for each specimen and the second storage device 26 that stores the specimen information about at least some specimens for each specimen are provided. When the automatic analyzer 100 is in a predetermined operating state, the control device 3 is configured to perform the backup process for backing up the specimen information on the specimen meeting a predetermined backup condition from the first storage device 25 to the second storage device 26 and for deleting the specimen information about the backed up specimen from the first storage device 25. As a result, the time and effort of checking and deleting the contents of the specimen information subject to deletion can be reduced, and the cost and time required to back up specimen information can be reduced. Further, the information to be deleted and backed up is narrowed down to the specimen information so that the deletion and backup of the information for securing the storage capacity are performed so that the time when the automatic analyzer cannot accept the user's request can be minimized, and an increase in an operation stop time of the automatic analyzer can be suppressed.

Second Embodiment

A second embodiment of the present invention will be described with reference to FIGS. 9 and 10.

In the present embodiment, a condition different from that of the first embodiment is set as a condition for setting the information of the specimen to be deleted.

Figure 9:
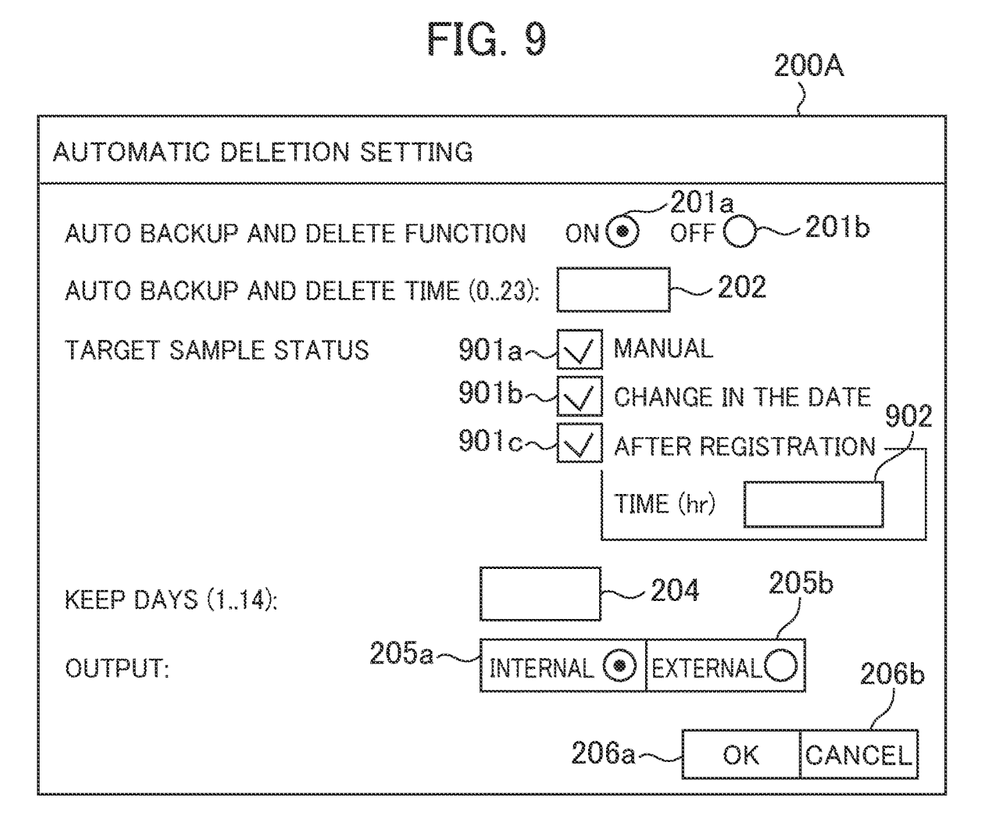
FIG. 9 is a diagram showing a setting screen related to an automatic deletion function (automatic backup process) of sample information according to a second embodiment.

FIG. 9 is a diagram showing a setting screen for an automatic deletion function (automatic backup process) of sample information according to the present embodiment.

Figure 10:
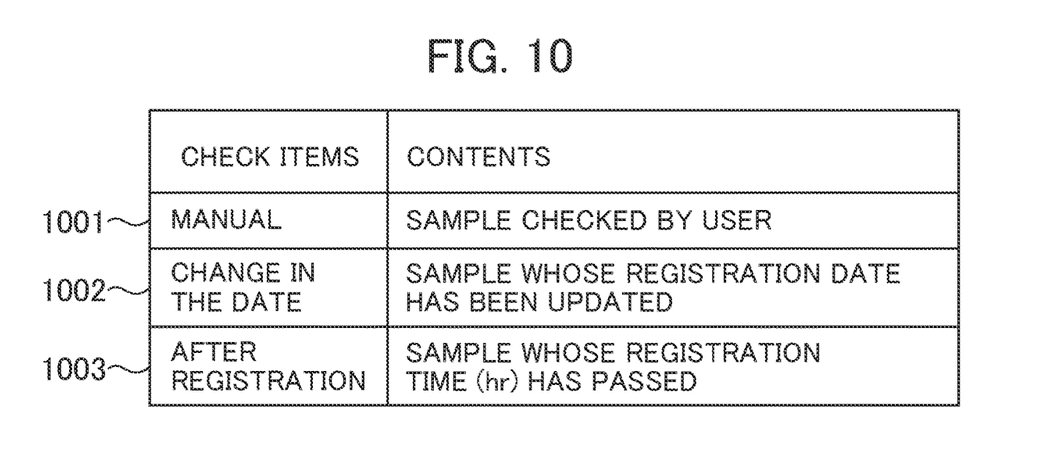
FIG. 10 is a diagram illustrating setting conditions shown in FIG. 9.

FIG. 10 is a diagram illustrating setting conditions shown in FIG. 9. In the figure, the same signs are attached to members similar to those in the first embodiment, and a description thereof will be omitted.

On a setting screen 200A shown in FIG. 9, "Target Sample Status" is an item for setting the information of the specimen to be deleted when the automatic deletion function is enabled. The measurement state of the specimen to be deleted is set by selecting a checkbox 901*a* of "Manual", a checkbox 901*b* of "Change in the date", and a checkbox 901*c* of "After registration". When the check box 901*c* of "After registration" is selected, the measurement state is set by entering a time in the input portion 902.

As shown in FIG. 10, "Manual" 1001 targets the specimens checked by the user. The specimen checked by the user is in a state in which the user checks a "Check" item 702 of FIG. 7, and the specimen in which the backup and automatic deletion are performed is clear by the user visually checking the specimen status and setting the specimen to the deletion target, and management becomes easy. In addition, "Change in the date" 1002 is a specimen in which date when the specimen is registered is updated to the next day. Further, "After registration" 1003 sets the specimen that has elapsed a set time after registering the specimen (setting the input portion 902 of FIG. 9) to a deletion target (1003). The settings of "Change in the date" and "After registration" can be set according to the operation status of the device at each site.

Other configurations are similar to those in the first embodiment.

The same effects as those of the first embodiment can be obtained in the present invention configured as described above.

<Added>

The present invention is not limited to the embodiments described above, and includes various deformation examples and combinations within a range that does not deviate from the spirit of the invention. Further, the present invention is not limited to those each with all the configurations described in the above embodiments, and includes a part of the configuration deleted. Further, each of the above configurations, functions, and the like may be realized by designing some or all thereof, for example, with an integrated circuit. Further, each of the above configurations, functions, and the like may be realized by software by interpreting and executing a program in which the processor realizes each function.

LIST OF REFERENCE SIGNS

1 . . . sample container, 2 . . . sample disk, 3 . . . control device, 4 . . . interface, 5 . . . sample dispensing probe, 6 . . . reaction container, 7 . . . sample pump, 8 . . . thermostat, 9 . . . reaction disk, 10*a*, 10*b* . . . reagent dispensing probe, 11 . . . reagent pump, 12*a*, 12*b* . . . reagent disk, 13 . . . stirring device, 14 . . . light source, 15 . . . multi-wavelength photometer, 16 . . . keyboard, 17 . . . printer, 18 . . . CRT screen, 19*a*, 19*b* . . . reagent container, 20 . . . reaction container cleaning system, 20*a* . . . reaction container cleaning mechanism, 24 . . . FD drive, 25 . . . first storage device, 26 . . . second storage device, 100 . . . automatic analyzer, 200, 200A . . . setting screen, 202, 204, 403, 902 . . . input unit, 203*a* to 203*c*, 901*a* to 901*c* . . . check box, 700 . . . management screen, 701 . . . time information, 800 . . . read screen, 802 . . . list.

The invention claimed is:

1. An automatic analyzer, comprising:
a sample container transportation mechanism having a sample container containing a sample to be analyzed;
a reagent container holding mechanism having a reagent container containing a reagent for reacting with the sample;
a reaction disk holding a reaction container;
a sample dispensing mechanism configured to dispense the sample from the sample container into the reaction container;
a reagent dispensing mechanism configured to dispense the reagent into the reaction container;
a measuring device that measures a reaction solution in which the sample and the reagent are mixed together in the reaction container to obtain a measurement result;
a control device coupled to the sample container transportation mechanism, the reagent container holding mechanism, the reaction disk, the sample dispensing mechanism and the reagent dispensing mechanism;
a first storage device, coupled to the control device, configured to store sample information including the measurement result of the reaction solution for each of a plurality of samples including the sample; and
a second storage device, coupled to the control device, that stores sample information of at least some of the plurality of samples among the sample information stored in the first storage device,
wherein the control device is programmed to:
determine whether the automatic analyzer has reached a predetermined operation state of a standby state, in which there is no change in a state of the sample, or a rack reception state, in which analysis of the sample has been completed, and upon determining the automatic analyzer is in the predetermined operation state, perform a backup process of backing up the sample information of samples among the plurality of samples which satisfy a predetermined backup condition from the first storage device to the second storage device, and delete the sample information which has been backed-up by the backup process from the first storage device,
wherein the predetermined backup condition being a first measurement state, indicating that the sample information has previously been transferred to an external storage system, a second measurement state indicating that the measurement result corresponding to the sample information has previously been output and the measurement result corresponding to the sample information is within a predetermined range, or a third measurement state indicating that the measurement result corresponding to the sample information has previously been output and the measurement result corresponding to the sample information is not within the predetermined range.

2. The automatic analyzer according to claim 1,
wherein the control device is programmed to execute the backup process of the sample information after a predetermined scheduled deletion time has passed.

3. The automatic analyzer according to claim 1,
wherein the operation state of the automatic analyzer is the standby state.

4. The automatic analyzer according to claim 2,
wherein the control device is programmed to:
execute the backup process of the sample information which satisfy the predetermined backup condition after the predetermined scheduled deletion time has passed upon determining the automatic analyzer is in the standby state, and
postpone the backup process upon determining the automatic analyzer is in an operation state in which there is a change in the state of the sample, and perform the backup process upon determining the operation state of the automatic analyzer transitions to the standby state.

* * * * *